(12) United States Patent
Huang et al.

(10) Patent No.: US 12,529,527 B2
(45) Date of Patent: Jan. 20, 2026

(54) MANUFACTURING METHOD OF HEAT PIPE STRUCTURE

(71) Applicant: Delta Electronics, Inc., Taoyuan (TW)

(72) Inventors: Shih-Lin Huang, Taoyuan (TW); Xiaojun Chen, Taoyuan (TW); Guangshuai Wang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 8 days.

(21) Appl. No.: 18/750,928

(22) Filed: Jun. 21, 2024

(65) Prior Publication Data

US 2024/0344774 A1 Oct. 17, 2024

Related U.S. Application Data

(62) Division of application No. 17/336,002, filed on Jun. 1, 2021, now abandoned.

(30) Foreign Application Priority Data

Oct. 16, 2020 (CN) .......................... 202011107612.2

(51) Int. Cl.
*B23P 15/26* (2006.01)
*F28D 15/02* (2006.01)
*F28D 15/04* (2006.01)

(52) U.S. Cl.
CPC ....... *F28D 15/046* (2013.01); *F28D 15/0283* (2013.01); *F28D 15/0233* (2013.01)

(58) Field of Classification Search
CPC ............... F28D 15/046; F28D 15/0283; F28D 15/0233; B23P 15/26
See application file for complete search history.

(56) References Cited

U.S. PATENT DOCUMENTS

| 5,634,724 | A | 6/1997 | Zang et al. |
| 8,622,117 | B2 | 1/2014 | Wu et al. |
| 10,448,540 | B2 | 10/2019 | Hou et al. |
| 2001/0003308 | A1 | 6/2001 | Li |
| 2002/0189793 | A1 | 12/2002 | Noda et al. |
| 2003/0173064 | A1 | 9/2003 | Ueki et al. |

(Continued)

FOREIGN PATENT DOCUMENTS

| CN | 103776289 A | 5/2014 |
| CN | 107889422 A | 4/2018 |

(Continued)

OTHER PUBLICATIONS

English translation of JP-H10238976-A (Year: 1998).*

*Primary Examiner* — Jun S Yoo
(74) *Attorney, Agent, or Firm* — KIRTON McCONKIE; Evan R. Witt

(57) ABSTRACT

A manufacturing method of a heat pipe structure is provided. Firstly, a step S1 is performed. An original heat pipe structure is provided. The original heat pipe structure includes an enclosed space in a sealed state and an original wick structure disposed within the enclosed space. Then, a step S2 is performed. Portion of the original heat pipe structure is deformed to form a deformation portion. The deformation portion clamps portion of the original wick structure. The enclosed space is separated into two subspaces. Then, a step S3 is performed. The deformation portion is cut to separate the two subspaces to form two heat pipe structures.

16 Claims, 10 Drawing Sheets

(56) References Cited

U.S. PATENT DOCUMENTS

| | | | |
|---|---|---|---|
| 2006/0096740 A1 | | 5/2006 | Zheng |
| 2007/0107878 A1 | | 5/2007 | Hou et al. |
| 2009/0040726 A1 | | 2/2009 | Hoffman et al. |
| 2018/0087844 A1 | | 3/2018 | Huang |
| 2018/0238643 A1 | | 8/2018 | Park et al. |
| 2020/0326133 A1 | * | 10/2020 | Cheng ................ H05K 7/20336 |

FOREIGN PATENT DOCUMENTS

| | | | | |
|---|---|---|---|---|
| CN | 210135811 U | | 3/2020 | |
| JP | H10238976 A | * | 9/1998 | ......... F28D 15/0283 |
| TW | M483401 U | | 8/2014 | |
| TW | I601929 B | | 10/2017 | |

\* cited by examiner

MANUFACTURING METHOD OF HEAT PIPE STRUCTURE

CROSS-REFERENCE TO RELATED APPLICATION

This application is a Divisional Application of U.S. patent application Ser. No. 17/336,002 filed on Jun. 1, 2021 and entitled "HEAT PIPE STRUCTURE AND MANUFACTURING METHOD THEREOF", which claims priority to China Patent Application No. 202011107612.2 filed on Oct. 16, 2020. The entire contents of the above-mentioned patent applications are incorporated herein by reference for all purposes.

FIELD OF THE INVENTION

The present disclosure relates to a heat pipe structure, and more particularly to a manufacturing method of the heat pipe structure for enhancing thermal conducting efficiency.

BACKGROUND OF THE INVENTION

Nowadays, the electronic device such as smartphone includes a heat dissipation device (e.g. heat pipe structure) collocated with a case of the electronic device for dissipating the heat so as to meet the thermal requirements. The wick structure within the heat pipe structure is configured to absorb the heat generated by the electronic device while the electronic device is operated and transfer the heat to the entire heat pipe structure. Then, the heat is further transferred from the heat pipe structure to the case in contact with the heat pipe structure to be dissipated away.

The traditional manufacturing method of the heat pipe structure is described below. Firstly, two opposite sides of the traditional heat pipe structure are shrunk. The diameter of each side of the heat pipe structure is reduced to a setting value. Then, one of the two opposite sides of the heat pipe structure is sealed permanently by performing spot-welding. Thereafter, a wick structure is disposed within the heat pipe structure. Then, the inner space of the heat pipe structure is evacuated from the other side of the heat pipe structure, and the other side of the heat pipe structure is sealed temporarily. Finally, the other side of the heat pipe structure is sealed permanently by performing spot-welding, so that the sealed state of the heat pipe structure is maintained. However, the heat pipe structure is evacuated and welded while the heat pipe structure is sealed. The sealing region of the heat pipe structure cannot include any wick structure. The rest region nearby the sealing region forms an ineffective end of the heat pipe structure because the rest region cannot conduct the heat. The ineffective ends of the heat pipe structure reduce the available space for conducting and dissipating the heat. Consequently, the thermal conducting efficiency of the heat pipe structure is reduced. Moreover, the shape of the two sides of the heat pipe structure is changed, such as triangular or irregular, after the heat pipe structure is shrunk and sealed by performing spot-welding. The profile of the heat pipe structure cannot match with that of the case of the electronic device. Consequently, the electronic device can only employ the heat pipe structure in relatively small volume, which causes the electronic device to be overheated easily.

Therefore, there is a need of providing a manufacturing method of a heat pipe structure so as to address the issues encountered by the prior arts.

SUMMARY OF THE INVENTION

An object of the present disclosure provides a heat pipe structure and a manufacturing method of the heat pipe structure. The heat pipe structure has advantage of enhancing thermal conducting efficiency and matching the shape of the inner space of the electronic device.

In accordance with an aspect of the present disclosure, a manufacturing method of a heat pipe structure is provided. Firstly, a step S1 is performed. An original heat pipe structure is provided. The original heat pipe structure includes an enclosed space in a sealed state and an original wick structure disposed within the enclosed space. Then, a step S2 is performed. Portion of the original heat pipe structure is deformed to form a deformation portion. The deformation portion clamps portion of the original wick structure. The enclosed space is separated into two subspaces. Then, a step S3 is performed. The deformation portion is cut to separate the two subspaces to form two heat pipe structures.

In accordance with a further aspect of the present disclosure, a manufacturing method of a heat pipe structure is provided. Firstly, a step S1 is performed. An original heat pipe structure is provided. The original heat pipe structure includes an enclosed space in a sealed state and an original wick structure disposed within the enclosed space. Then, a step S2 is performed. Portion of the original heat pipe structure is deformed to form a deformation portion. The deformation portion clamps portion of the original wick structure. The enclosed space is separated into two subspaces. Then, a step S3 is performed. The deformation portion is cut to separate the two subspaces to form the heat pipe structure.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
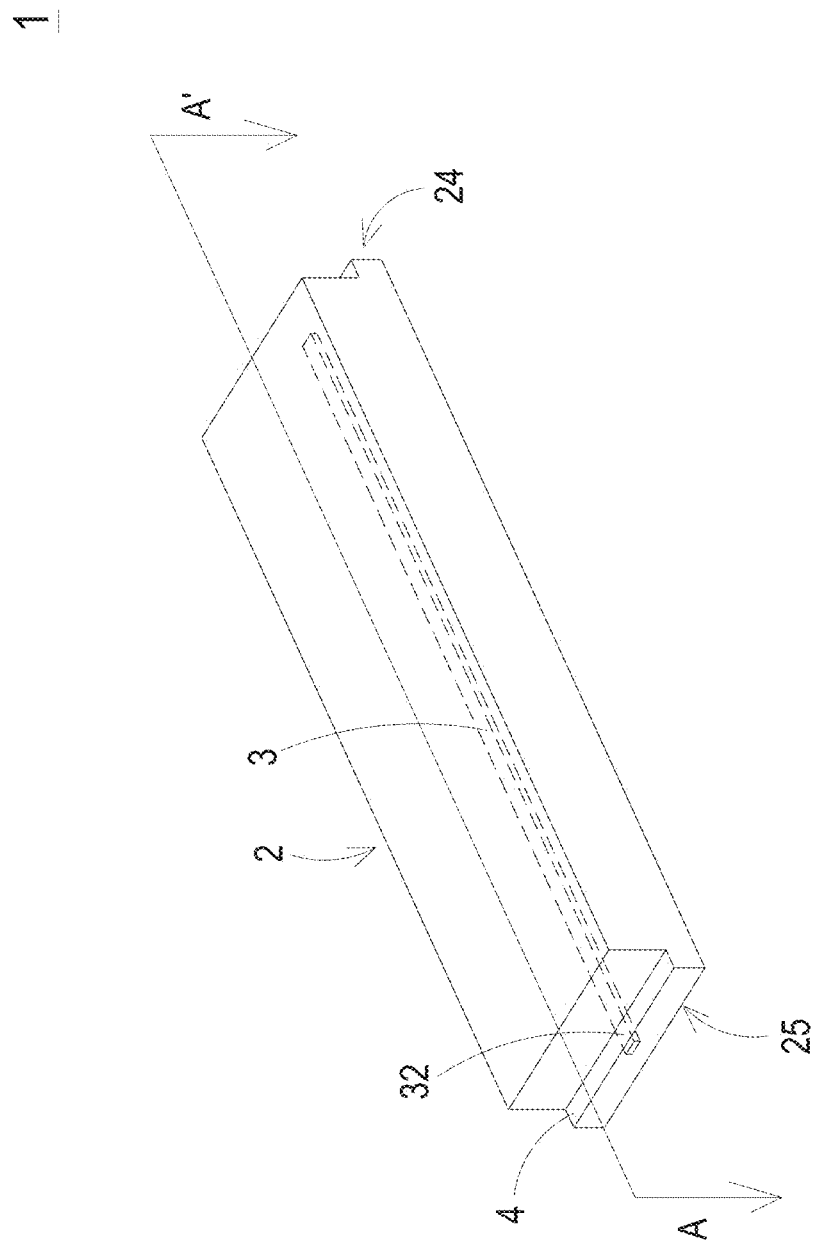
FIG. 1 is a schematic perspective view illustrating a heat pipe structure according to a first embodiment of the present disclosure.
Figure 2:
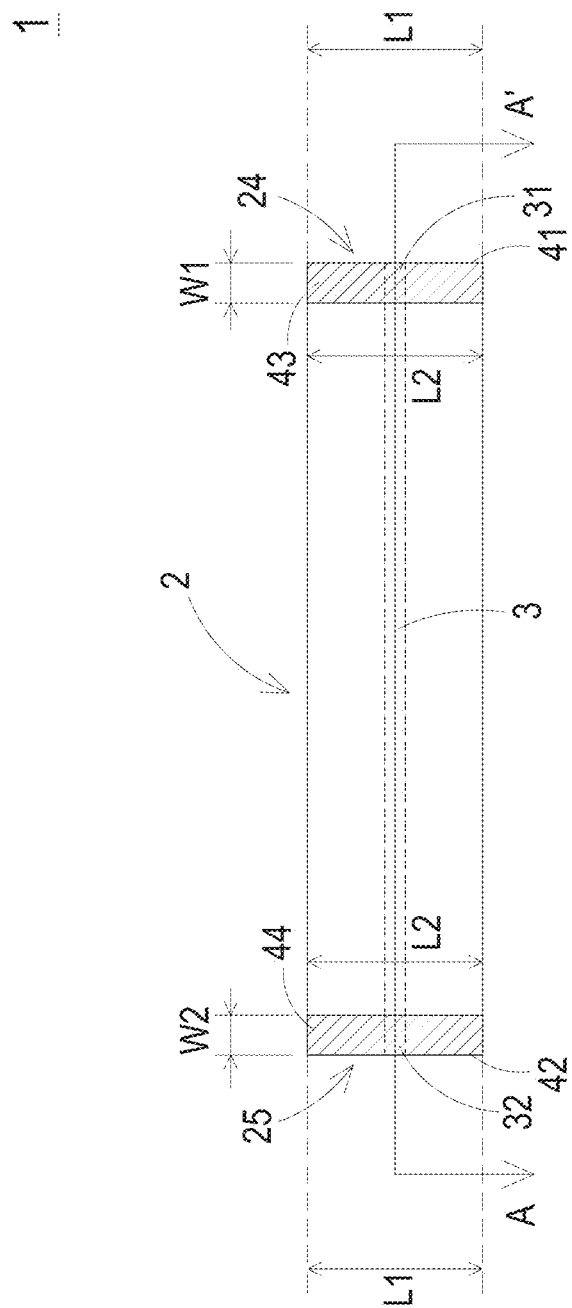
FIG. 2 is a top elevational view illustrating the heat pipe structure of FIG. 1.
Figure 3:
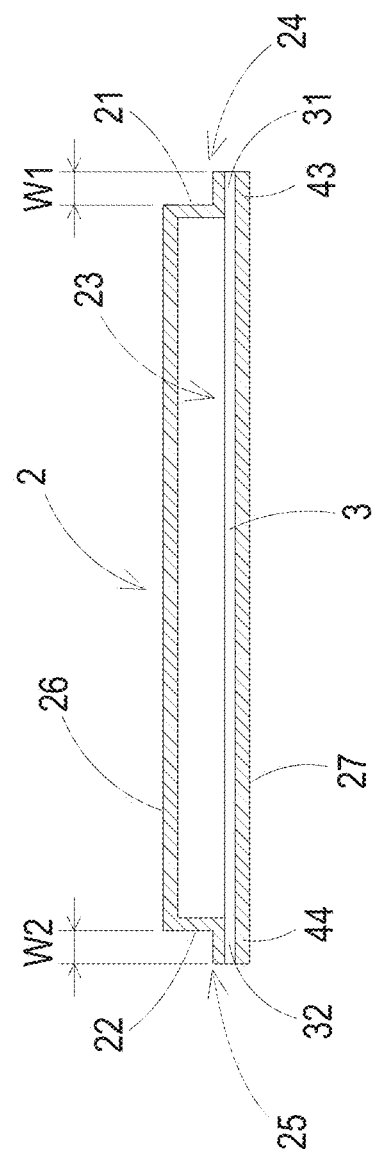
FIG. 3 is a schematic cross-sectional view illustrating the heat pipe structure of FIG. 1 and taken along the line A-A'.

FIG. 1 is a schematic perspective view illustrating a heat pipe structure according to a first embodiment of the present disclosure. FIG. 2 is a top elevational view illustrating the heat pipe structure of FIG. 1. FIG. 3 is a schematic cross-sectional view illustrating the heat pipe structure of FIG. 1 and taken along the line A-A'. As shown in FIGS. 1 to 3, the heat pipe structure 1 is disposed within an electronic device (not shown in figure). For example, the heat pipe structure 1 is disposed within a smartphone, a camera, a video camera, an augmented reality device, a virtual reality device or a smartwatch for dissipating the heat generated by an electronic component (not shown in figure) of the electronic device while the electronic component is operated. The heat pipe structure 1 is a flat structure and includes a case 2, a wick structure 3 and two lateral peripheral structures 4. The case 2 is a tubulous case and includes an enclosed space 23 defined by the two lateral peripheral structures 4 and a plurality of case wall portions disposed between the lateral peripheral structures 4. The case wall portions include an upper case wall 26, a lower case wall 27, a first lateral case wall 21 at the first side 24, and a second lateral case wall 22 at the second side 25. The enclosed space 23 is in a sealed state, and the first lateral case wall 21 and the second lateral case wall 22 are opposite to each other.

The wick structure 3 is disposed within the enclosed space 23 of the case 2. The wick structure 3 is attached to an inner surface of the first lateral peripheral structure 43 and an inner surface of the second lateral peripheral structure 44 of the tubulous case 2, and the wick structure 3 is not attached with an inner surface of the upper case wall 26, the first lateral case wall 21, and the second lateral case wall 22. The wick structure 3 includes a first end 31 and a second end 32 opposite to each other. The first end 31 of the wick structure 3 is adjacent to the first side 24 of the case 2, and the second end 32 of the wick structure 3 is adjacent to the second side 25 of the case 2. The wick structure 3 is configured to absorb and conduct the working fluid, such as water, which is located within the case 2. While the case 2 receives the heat transferred from the electronic component, the working fluid within the case 2 is conducted by the wick structure 3 so as to dissipate the heat and equalize the temperature. Preferably but not exclusively, the wick structure 3 is a copper mesh, a metal line, a textile mesh or a sintered structure.

Each of the two lateral peripheral structures 4 is a lateral peripheral structure. For describing easily, one of the two lateral peripheral structures 4 located at the right side of FIG. 2 is defined as a first lateral peripheral structure 43, and the other of the two lateral peripheral structures 4 located at the left side of FIG. 3 is defined as a second lateral peripheral structure 44. The first lateral peripheral structure 43 is configured to seal the first side 24 of the case 2 and clamp at least part of the first end 31 of the wick structure 3. The second lateral peripheral structure 44 is configured to seal the second side 25 of the case 2 and clamp at least part of the second end 32 of the wick structure 3.

From above descriptions, the heat pipe structure 1 of the present disclosure includes two lateral peripheral structures 4. The first lateral peripheral structure 43 seals the first side 24 of the case 2 and clamps at least part of the first end 31 of the wick structure 3. The second lateral peripheral structure 44 seals the second side 25 of the case 2 and clamps at least part of the second end 32 of the wick structure 3. Consequently, the sealing regions of the heat pipe structure 1 of the present disclosure include portion of the wick structure 3 while the two sides of the case 2 are sealed. The two sides of the traditional heat pipe structure are ineffective ends, respectively, and the available space for conducting and dissipating the heat is reduced. Compared with the traditional heat pipe structure, the rest region nearby the sealing regions of the heat pipe structure 1 still can be used to conduct the heat. The available space of the heat pipe structure 1 for conducting and dissipating the heat is increased. The thermal conducting efficiency of the heat pipe structure 1 of the present disclosure is enhanced.

A length of the first end 31 of the wick structure 3 covered or clamped by the first lateral peripheral structure 43 is equal to a width W1 of the first lateral peripheral structure 43. Preferably but not exclusively, the width W1 of the first lateral peripheral structure 43 is less than or equal to 2.5 mm. Moreover, the edge of the first lateral peripheral structure 43 is formed by cutting. As shown in FIG. 2, an edge 41 of the first lateral peripheral structure 43 located at the periphery of the heat pipe structure 1 is formed by cutting. A length of the second end 32 of the wick structure 3 covered or clamped by the second lateral peripheral structure 44 is equal to a width W2 of the second lateral peripheral structure 44. Preferably but not exclusively, the width W2 of the second lateral peripheral structure 44 is less than or equal to 2.5 mm. Moreover, the edge of the second lateral peripheral structure 44 is formed by cutting. As shown in FIG. 2, an edge 42 of the second lateral peripheral structure 44 located at the periphery of the heat pipe structure 1 is formed by cutting.

In some embodiments, the shape of the edge 41 of the first lateral peripheral structure 43 and the shape of the edge 42 of the second lateral peripheral structure 44 are straight, respectively. In some other embodiments, the shape of the edge 41 of the first lateral peripheral structure 43 and the shape of the edge 42 of the second lateral peripheral structure 44 are curved, respectively. Certainly, the shape of the edge 41 of the first lateral peripheral structure 43 and the shape of the edge 42 of the second lateral peripheral structure 44 are not limited to the above embodiments and are adjustable according to the practical requirements. In some embodiments, a length of each of the two lateral peripheral structures 4 is greater than or equal to a length of the corresponding side of the case 25. As shown in FIG. 2, a length L2 of the first lateral peripheral structure 43 and a length L2 of the second lateral peripheral structure 44 are equal to a length L1 of the first side 24 of the case 2 and a length L1 of the second side 25 of the case 2. In some other embodiments, the length L2 of the first lateral peripheral structure 43 and the length L2 of the second lateral peripheral structure 44 are greater than the length L1 of the first side 24 of the case 2 and the length L1 of the second side 25 of the case 2 (not shown in figure).

Figure 4:
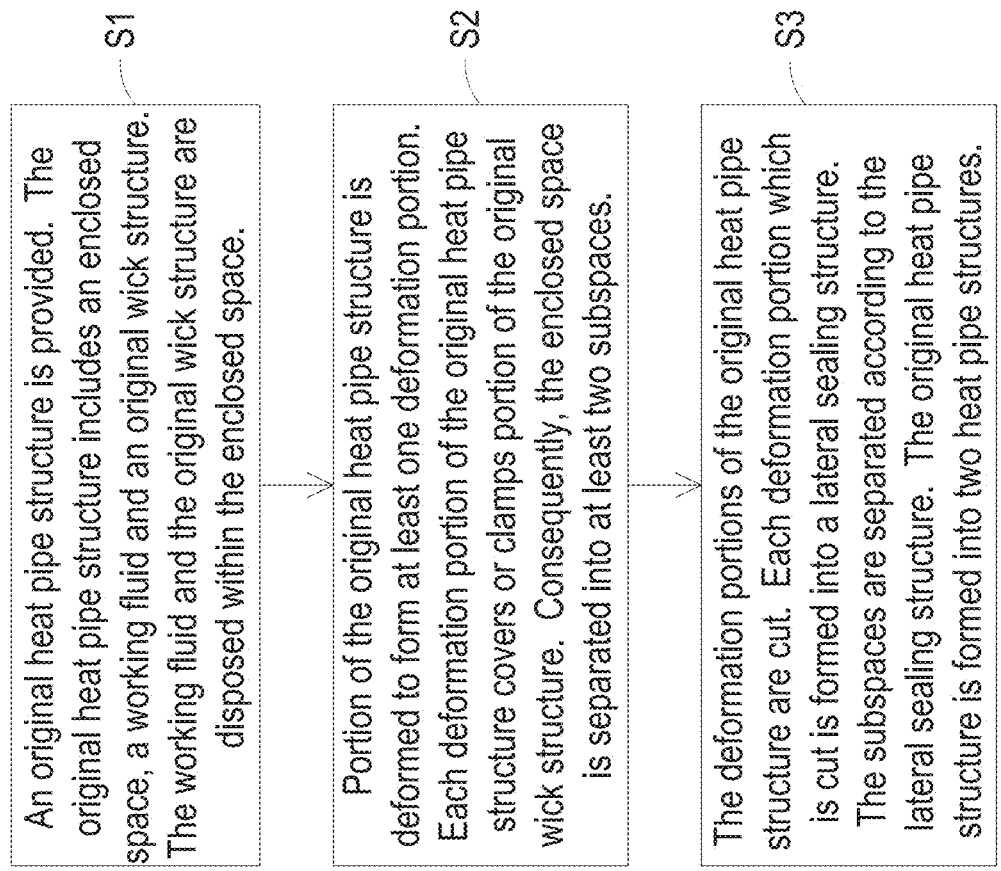
FIG. 4 is a flowchart illustrating a manufacturing method of the heat pipe structure of FIG. 1 according to an embodiment of the disclosure.
Figure 5A:
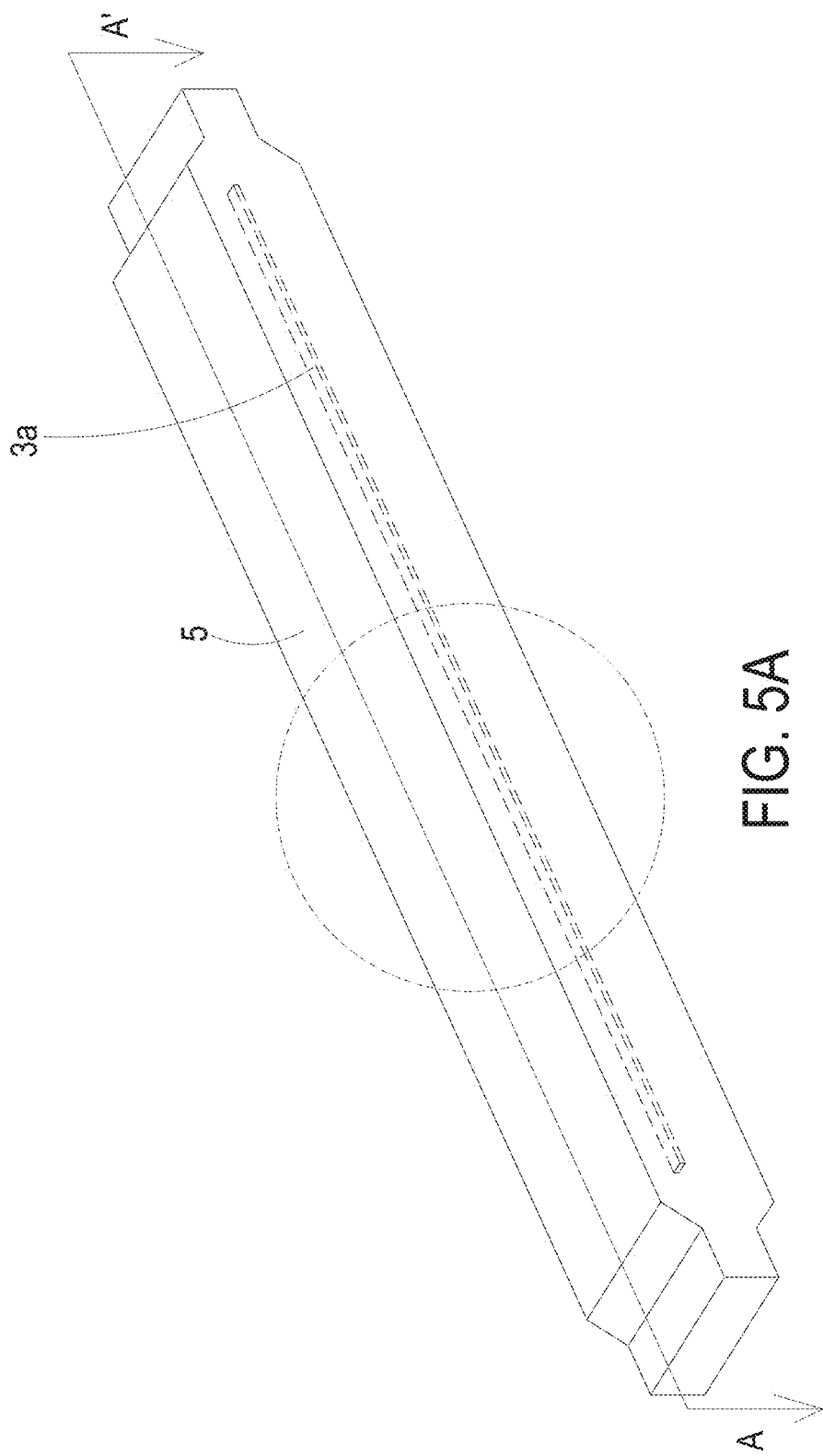
FIG. 5A is a schematic perspective view illustrating an original heat pipe structure of FIG. 4.
Figure 5B:
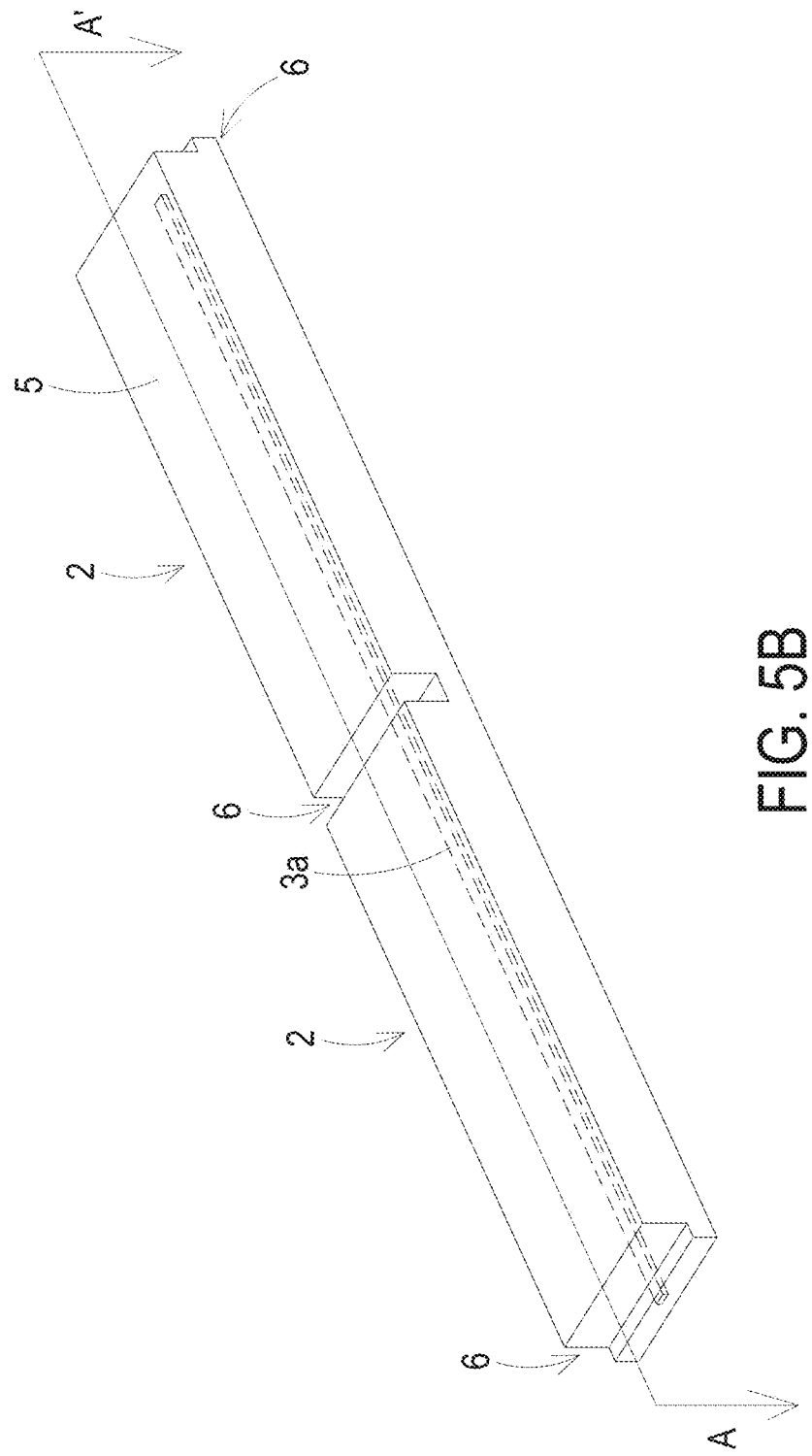
FIG. 5B is a schematic perspective view illustrating the heat pipe structure of FIG. 1 formed by portion of the original heat pipe structure indicated in the dashed line of FIG. 5A.
Figure 5C:
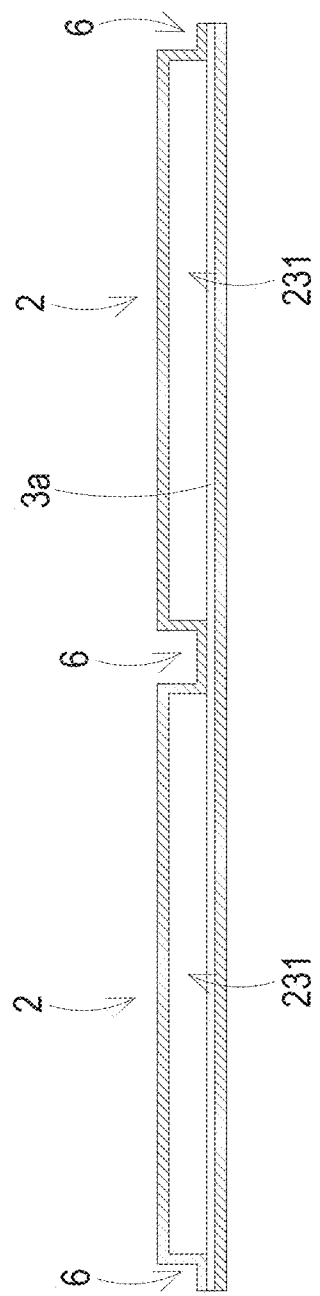
FIG. 5C is a schematic cross-sectional view illustrating the original heat pipe structure of FIG. 5B and taken along the line A-A'.

FIG. 4 is a flowchart illustrating a manufacturing method of the heat pipe structure of FIG. 1 according to an embodiment of the disclosure. FIG. 5A is a schematic perspective view illustrating an original heat pipe structure of FIG. 4. FIG. 5B is a schematic perspective view illustrating the heat pipe structure of FIG. 1 formed by portion of the original heat pipe structure indicated in the dashed line of FIG. 5A. FIG. 5C is a schematic cross-sectional view illustrating the original heat pipe structure of FIG. 5B and taken along the line A-A'. As shown in FIGS. 4, 5A, 5B and 5C, firstly, a step S1 is performed. In the step S1, an original heat pipe structure 5 is provided, as shown in FIG. 5A. The original heat pipe structure 5 includes an enclosed space, a working fluid and an original wick structure 3a. The enclosed space is in a sealed state. The working fluid and the original wick structure 3a are disposed within the enclosed space. Preferably but not exclusively, the shape of the original heat pipe structure 5 is cuboid, trapezoid or parallelepiped. Then, a step S2 is performed. In the step S2, portion of the original heat pipe structure 5 is deformed to form at least one deformation portion 6. As shown in FIG. 5A, in an embodiment, three regions of the original heat pipe structure 5 indicated in the dotted line of FIG. 5A are deformed. Consequently, portion of the original heat pipe structure 5 indicated in the dotted line of FIG. 5A are formed into three deformation portions 6 of FIG. 5B. As shown in FIG. 5B, the three deformation portions 6 are located at two opposite sides of the original heat pipe structure 5 and the center of the original heat pipe structure 5. A thickness of the deformation portion 6 of the original heat pipe structure 5 is less than a thickness of the rest portion of the original heat pipe structure 5. Each deformation portion 6 of the original heat pipe structure 5 covers or clamps portion of the original wick structure 3a. The two deformation portions 6 located at the two opposite sides of the original heat pipe structure 5 cover or clamp the two opposite ends of the original wick structure 3a, respectively. The deformation portion 6 located at the center of the original heat pipe structure 5 covers or clamps the center of the original wick structure 3a. Consequently, the enclosed space 23 is separated into at least two subspaces 231 which are sealed hermetically, such as the two subspaces 231 of FIG. 5C. In some embodiments, the number of the subspace 231 is increased as the number of the deformation portion 6 of the original heat pipe structure 5 is increased.

Then, a step S3 is performed. In the step S3, the deformation portions 6 of the original heat pipe structure 5 are cut. Each deformation portion 6 which is cut is formed into a lateral peripheral structure 4. The subspaces 231 are separated according to the lateral peripheral structure 4. In an embodiment, the original heat pipe structure 5 is formed into two heat pipe structures 1 of FIG. 1. Each subspace 231 is configured as the corresponding enclosed space 23 of the heat pipe structure 1. In some embodiments, the deformation portion 6 of the original heat pipe structure 5 is sintered to form the lateral peripheral structure 4. In this embodiment, the two cutting regions located at one of the two sides of the original heat pipe structure 5 and the center of the original heat pipe structure 5 are configured as two edges of the two lateral peripheral structures 4 of the periphery of the heat pipe structure 1, such as the edge 41 of the first lateral peripheral structure 43 and the edge 42 of the second lateral peripheral structure 44 of FIG. 2.

Each deformation portion 6 of the heat pipe structure 1 of the present disclosure is cut to form the lateral peripheral structure 4. Consequently, the shape of the two sides of the heat pipe structure 1 (i.e. the shape of the cutting regions of the two lateral peripheral structures 4) is cut according to the shape of the case of the electronic device. Preferably but not exclusively, as shown in FIG. 2, the heat pipe structure 1 is cut to form a cuboid heat pipe structure, a trapezoid heat pipe structure or a parallelepiped heat pipe structure. Consequently, the shape of the heat pipe structure 1 is matched to the shape of the case of the electronic device for assembling the electronic device flexibly. The electronic device can employ the heat pipe structure 1 having larger volume. As the space utility rate of the electronic device is enhanced, the thermal conducting efficiency is enhanced for solving the overheating of the electronic device. The performance of the electronic device is enhanced.

In some embodiments, in the step S3, the two lateral peripheral structures 4 are cut by a sealing machine (not shown in figure). The cross section area of a cutting end of the sealing machine for cutting each deformation portion 6 to form the lateral peripheral structure 4 is greater than the area of each lateral peripheral structure 4. Consequently, the area of the lateral peripheral structure 4 is smaller and the length of the heat pipe structure 1 is reduced. The heat pipe structure 1 is assembled to the electronic device flexibly.

In some embodiments, the heat pipe structure 1 is formed from the original heat pipe structure 5 by the above manufacturing method. Alternatively, the heat pipe structure 1 is formed from a vapor chamber by the above manufacturing method. The shape of the heat pipe structure 1 is not limited cuboid, trapezoid or parallelepiped.

Figure 6:
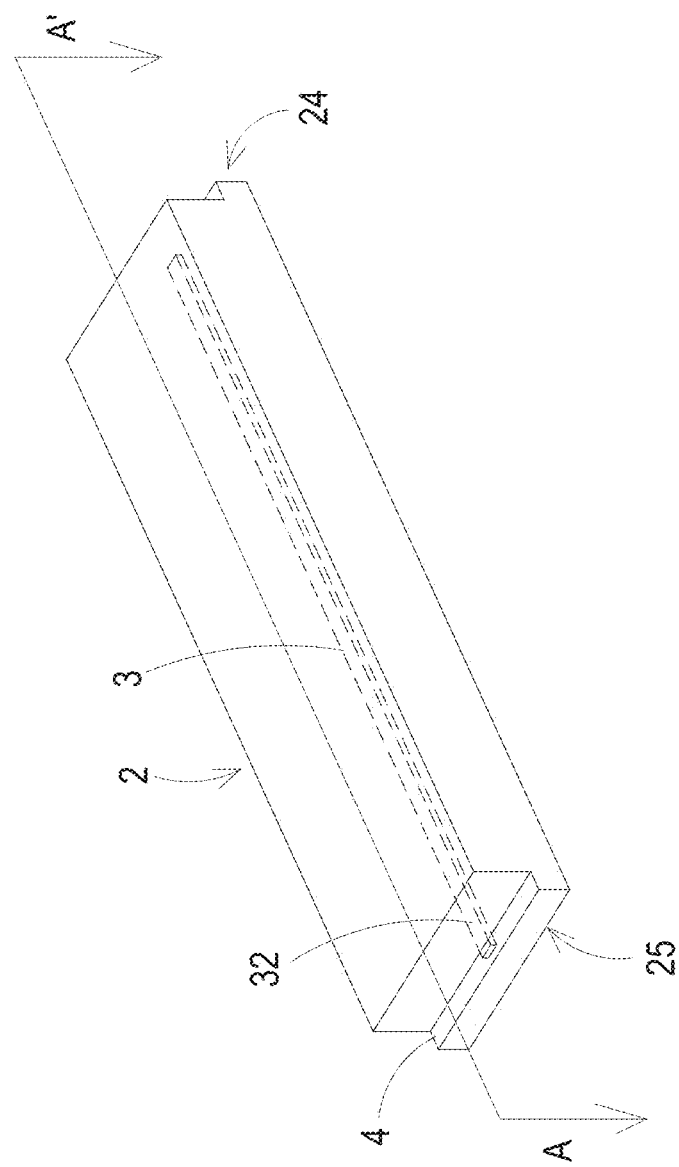
FIG. 6 is a schematic perspective view illustrating a heat pipe structure according to a second embodiment of the present disclosure.
Figure 7:
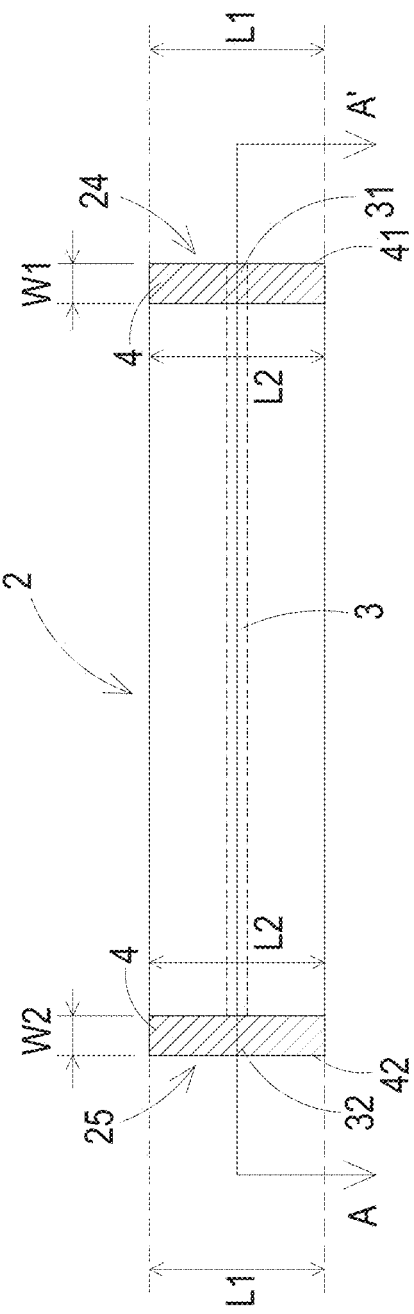
FIG. 7 is a top elevational view illustrating the heat pipe structure of FIG. 6.
Figure 8:
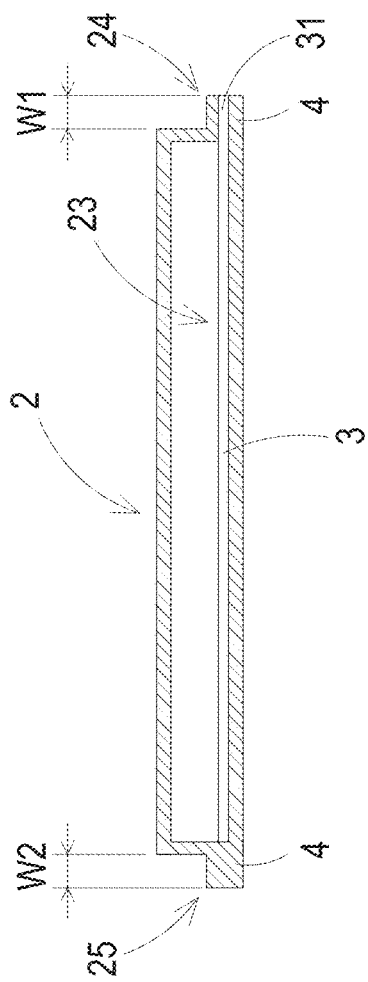
FIG. 8 is a schematic cross-sectional view illustrating the heat pipe structure of FIG. 6 and taken along the line A-A'.

FIG. 6 is a schematic perspective view illustrating a heat pipe structure according to a second embodiment of the present disclosure. FIG. 7 is a top elevational view illustrating the heat pipe structure of FIG. 6. FIG. 8 is a schematic cross-sectional view illustrating the heat pipe structure of FIG. 6 and taken along the line A-A'. As shown in FIGS. 6 to 8, the heat pipe structure 1a of this embodiment includes a case 2, a wick structure 3 and two lateral peripheral structures 4. The structures and operations of the case 2, the wick structure 3 and the two lateral peripheral structures 4 are similar to those of FIGS. 1 and 2, and are not redundantly described herein. In this embodiment, the first lateral peripheral structure 43 is configured to seal the first side 24 of the case 2. The first lateral peripheral structure 43 is configured to cover or clamp the first end 31 of the wick structure 3. The second lateral peripheral structure 44 is configured to seal the second side 25 of the case 2. However, the second lateral peripheral structure 44 does not cover or clamp the second end 32 of the wick structure 3.

From the above descriptions, the present disclosure provides a heat pipe structure and a manufacturing method of the heat pipe structure. The heat pipe structure of the present disclosure includes two lateral peripheral structures. The two lateral peripheral structures are configured to seal the two opposite sides of the case and clamp at least one end of the wick structure. Consequently, the rest region nearby the sealing regions of the heat pipe structure still can be used to conduct the heat. The available space of the heat pipe structure for conducting and dissipating the heat is increased. The thermal conducting efficiency of the heat pipe structure of the present disclosure is enhanced. Moreover, the two lateral peripheral structures of the heat pipe structure are formed by cutting. Consequently, the shape of the two sides of the heat pipe structure (i.e. the shape of the cutting regions of the two lateral peripheral structures) is cut according to the shape of the case of the electronic device. The shape of the heat pipe structure is matched to the shape of the case of the electronic device for assembling the electronic device flexibly. The electronic device can employ the heat pipe structure having larger volume. As the space utility rate of the electronic device is increased, the thermal conducting efficiency is enhanced for solving the overheating of the electronic device. The performance of the electronic device is enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A manufacturing method of a heat pipe structure, the manufacturing method comprising the steps of:
   (a) providing an original heat pipe structure, wherein the original heat pipe structure comprises an enclosed space in a sealed state and an original wick structure disposed within the enclosed space;
   (b) deforming portion of the original heat pipe structure to form a deformation portion, wherein the deformation portion clamps portion of the original wick structure, and the enclosed space is separated into two subspaces; and
   (c) sintering the deformation portion and cutting the deformation portion to separate the two subspaces to form two heat pipe structures.

2. The manufacturing method according to claim 1, wherein the deformation portion is cut to form a lateral peripheral structure.

3. The manufacturing method according to claim 2, wherein a length of the lateral peripheral structure is less than or equal to 2.5 mm.

4. The manufacturing method according to claim 1, wherein the heat pipe structure comprises a case, the case comprises the enclosed space defined by a first lateral peripheral structure, a second lateral peripheral structure and a plurality of case wall portions, the plurality of case wall portions are disposed between the first lateral peripheral structure and the second lateral peripheral structure, wherein the plurality of case wall portions comprise an upper case wall, a lower case wall, a first lateral case wall, and a second lateral case wall, wherein the first lateral case wall extends between the first lateral peripheral structure and the upper case wall and the second lateral case wall extends between the second lateral peripheral structure and the upper case wall, wherein the enclosed space is in a sealed state.

5. The manufacturing method according to claim 4, wherein the heat pipe structure comprises a sub wick structure disposed within the enclosed space and comprising a first end and a second end, wherein the first end and the second end are opposite to each other, wherein the first end is disposed within and attached to the first lateral peripheral structure and extended to an outer surface of the first lateral peripheral structure, and/or the second end is disposed within and attached to the second lateral peripheral structure and extended to an outer surface of the second lateral peripheral structure, and the sub wick structure is not attached to an inner surface of the upper case wall, the first lateral case wall, and the second lateral case wall.

6. The manufacturing method according to claim 5, wherein the first lateral peripheral structure clamps the first end of the sub wick structure, and the second lateral peripheral structure clamps the second end of the sub wick structure, wherein one of the two lateral peripheral structures has an edge, and the edge is formed by cutting.

7. The heat pipe structure according to claim 5, wherein a length of each of the two lateral peripheral structures is greater than or equal to a length of the corresponding side of the case.

8. The manufacturing method according to claim 1, wherein the shape of the heat pipe structure is cuboid, trapezoid or parallelepiped.

9. A manufacturing method of a heat pipe structure, the manufacturing method comprising the steps of:
   (a) providing an original heat pipe structure, wherein the original heat pipe structure comprises an enclosed space in a sealed state and an original wick structure disposed within the enclosed space;
   (b) deforming portion of the original heat pipe structure to form a deformation portion, wherein the deformation portion clamps portion of the original wick structure, and the enclosed space is separated into two subspaces; and
   (c) sintering the deformation portion and cutting the deformation portion to separate the two subspaces to form the heat pipe structure.

10. The manufacturing method according to claim 9, wherein the deformation portion is cut to form a lateral peripheral structure.

11. The manufacturing method according to claim 10, wherein a length of the lateral peripheral structure is less than or equal to 2.5 mm.

12. The manufacturing method according to claim 9, wherein the heat pipe structure comprises a case, the case comprises the enclosed space defined by a first lateral peripheral structure, a second lateral peripheral structure and a plurality of case wall portions, the plurality of case wall portions are disposed between the first lateral peripheral structure and the second lateral peripheral structure, wherein the plurality of case wall portions comprise an upper case wall, a lower case wall, a first lateral case wall, and a second lateral case wall, wherein the first lateral case wall extends between the first lateral peripheral structure and the upper case wall and the second lateral case wall extends between the second lateral peripheral structure and the upper case wall, wherein the enclosed space is in a sealed state.

13. The manufacturing method according to claim 12, wherein the heat pipe structure comprises a sub wick structure disposed within the enclosed space and comprising a first end and a second end, wherein the first end and the second end are opposite to each other, wherein the first end is disposed within and attached to the first lateral peripheral structure and extended to an outer surface of the first lateral peripheral structure, and/or the second end is disposed within and attached to the second lateral peripheral structure and extended to an outer surface of the second lateral peripheral structure, and the sub wick structure is not attached to an inner surface of the upper case wall, the first lateral case wall, and the second lateral case wall.

14. The manufacturing method according to claim 13, wherein the first lateral peripheral structure clamps the first end of the sub wick structure, and the second lateral peripheral structure clamps the second end of the sub wick structure, wherein one of the two lateral peripheral structures has an edge, and the edge is formed by cutting.

15. The heat pipe structure according to claim 13, wherein a length of each of the two lateral peripheral structures is greater than or equal to a length of the corresponding side of the case.

16. The manufacturing method according to claim 9, wherein the shape of the heat pipe structure is cuboid, trapezoid or parallelepiped.

* * * * *